(12) United States Patent
Repasi et al.

(10) Patent No.: US 7,877,801 B2
(45) Date of Patent: Jan. 25, 2011

(54) METHOD AND SYSTEM TO DETECT MALICIOUS SOFTWARE

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 923 days.

(21) Appl. No.: 11/803,761

(22) Filed: May 16, 2007

(65) Prior Publication Data

US 2007/0289015 A1 Dec. 13, 2007

Related U.S. Application Data

(60) Provisional application No. 60/808,917, filed on May 26, 2006.

(51) Int. Cl.
*G06F 11/00* (2006.01)
*G06F 12/14* (2006.01)
*H04L 9/32* (2006.01)

(52) U.S. Cl. .............................. 726/22; 726/23; 726/24; 726/25; 726/26; 713/187; 713/188; 713/189; 713/190; 713/194

(58) Field of Classification Search .................... 726/22
See application file for complete search history.

(56) References Cited

U.S. PATENT DOCUMENTS

| 5,440,723 A | * | 8/1995 | Arnold et al. | ................... 714/2 |
| 2002/0166059 A1 | * | 11/2002 | Rickey et al. | ............... 713/200 |
| 2005/0177736 A1 | * | 8/2005 | de los Santos et al. | ...... 713/188 |

OTHER PUBLICATIONS

Marx—"Rescue Me 2: Disinfection with Bootable rescue media", Mar. 2004.*

* cited by examiner

*Primary Examiner*—Longbit Chai
(74) *Attorney, Agent, or Firm*—Holland & Hart LLP (57) ABSTRACT

A method, system and computer program product for detecting a malicious entity in a processing system. The method (600) comprises booting the processing system into a boot module prior to loading an operating system (610); and detecting, using the boot module, if the processing system comprises a malicious entity (620).

17 Claims, 6 Drawing Sheets

METHOD AND SYSTEM TO DETECT MALICIOUS SOFTWARE

This application claims the benefit of priority from Provisional Application Ser. No. 60/808,917, filed on May 26, 2006, which is hereby incorporated by reference in its entirety.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

FIELD OF INVENTION

The present invention relates to a method and system to detect malicious software in a processing system.

BACKGROUND OF THE INVENTION

As used herein a "threat" comprises malicious software, also known as "malware" or "pestware", which comprises software that is included or inserted in a part of a processing system or processing systems for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

An operating system (sometimes abbreviated as "OS") is a program that, after being initially loaded into the processing system by a boot program, manages other programs in the processing system. The other programs are called applications or application programs. The application programs make use of the operating system by requesting services through a defined application program interface (API). In addition, users can interact directly with the operating system through a user interface such as a command language or a graphical user interface (GUI).

The Master Boot Record (MBR) is the first logical sector on a disk where the BIOS looks to load a program that boots the processing system.

The BIOS (b(asic) i(nput/)o(utput) s(ystem)) is a set of routines stored in read-only/flash memory that enable a computer to start the operating system and to communicate with the various devices in the system, such as disk drives, keyboard, monitor, printer, and communications ports.

A cryptographic hash function is a mathematical function that maps values from a large (or even very large) domain into a smaller range, and is a one-way function in that it is computationally infeasible to find any input which maps to any pre-specified output. Furthermore, the function is collision-free in that it is computationally infeasible to find any two distinct inputs which map to the same output.

A checksum is a digit representing the sum of the digits in an instance of digital data. The checksum can be used to check whether errors have occurred in transmission or storage.

Disassembly, in computer programming, is the result when machine code is translated back into assembly language. The term can also refer to the process of creating the disassembly, i.e. using and interacting with a disassembler.

An entity can comprise, but is not limited to, a file, an object, a class, a collection of grouped data, a library, a variable, a process, and/or a device.

Authors of malware have been seeking alternate methods to infect a processing system with malware which may not be easily detected using current malware detection practices. Methods that the author may use comprise, but are not limited to:

User mode API interception to conceal files, processes, registry entries and network connections;

Kernel mode API interception to conceal files, processes, registry entries and network connections;

Kernel mode modification of an Operating System's internal structures to conceal files, processes, registry entries and network connections; and Modification of an Operating System's core files to conceal files, processes, registry entries and network connections.

Conventional methods for detecting such malware comprise loading an anti-malware application from the operating system after the operating system has been loaded on the processing system. However, malware can be activated during the loading of the operating system, making it difficult for an operating system based anti-malware application to detect and remove such malware from the processing system.

Therefore, there exists a need for a method, system, computer readable medium of instructions, and/or a computer program product to detect malware that can be activated during the loading of an operating system which addresses or at least ameliorates problems inherent in the prior art.

There also exists a need for a method, system, computer readable medium of instructions, and/or a computer program product to disable malware that can be activated during the loading of an operating system of the processing system which addresses or at least ameliorates problems inherent in the prior art.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In a first aspect there is provided a method of detecting a malicious entity in a processing system, wherein the method comprises:

booting the processing system into a boot module prior to loading an operating system; and detecting, using the boot module, if the processing system comprises a malicious entity.

In one form, the method comprises disabling, using a disable module, the malicious entity in the processing system in the event of detection.

In another form, the boot module comprises a detection module, wherein the method comprises analysing, using the detection module, one or more data storage components of the processing system to determine whether the malicious entity has infected the processing system.

In one embodiment, the disable module comprises a plurality of submodules comprising at least one of a cryptographic hash module, a checksum module, a disassembly module, a black-list/white-list module, a relationship analysis module, and a pattern matching module, wherein the method comprises analysing, using the plurality of submodules, the data storage components of the processing system to determine whether the malicious entity has infected the processing system.

In another embodiment, the method comprises:

generating, using the cryptographic hash module, a cryptographic hash value of an entity stored on the data storage component of the processing system; and comparing the cryptographic hash value to a database to determine whether the entity is malicious, wherein the database comprises a plurality of cryptographic hash values identifying malicious entities.

In an optional form, the method comprises:

generating, using the checksum module, a checksum value of an entity stored on the data storage component of the processing system; and comparing, using the black-list/white-list module, the checksum value to a list to determine whether the entity is malicious, wherein the list comprises records indicative of malicious entities and non-malicious entities.

In another optional form, the method comprises:

disassembling, using the disassembly module, an entity stored on the data storage component of the processing system; and performing a comparison, using the pattern matching module, between the disassembled entity and a list of patterns associated with malicious activity.

In one particular embodiment, in the event that an entity stored on the data storage component of the processing system is determined to be malicious, the method comprises:

(a) setting the malicious entity as a base entity;
(b) determining an entity property of the base entity;
(c) determining, using the relationship analysis module, one or more related entities to the base entity which are related by the entity property; and
(d) performing, using the detection module, an analysis of the related entities to determine if one or more of the related entities are malicious.

In another particular embodiment, the method comprises:

setting the one or more related entities as the base entity; and repeating steps (b) and (c), followed by step (d) until an end condition is satisfied.

In one form, the end condition is at least one of:

when no related entities are determined in a particular repetition;

when no new related entities are determined in a particular repetition;

(when no related entities are determined in a period of time;

when the base entity has an entity property which is indicative of the end condition; and when a selected number of repetitions have been performed.

In another form, the disable module comprises at least one of a repair module, a removal module and an injection module In one embodiment, in the event that a malicious entity is detected, the method comprises repairing, using the repair module, at least a portion of data stored on the data storage component of the processing system comprising at least one of:

writing uncompromised data over at least a portion of the detected malicious entity; and copying, from an uncompromised data source, uncompromised data over at least a portion of the detected malicious entity.

In another embodiment, in the event that a malicious entity is detected, the method comprises:

determining, using the removal module, if the malicious entity is a critical entity to the processing system; and in the event that the malicious entity is non-critical, removing, using the removal module, the malicious entity from the data storage component of the processing system.

In one optional form, in the event that a malicious entity is detected, the method comprises injecting, using the injection module, data into the data storage component to disable the malicious entity performing malicious activity.

In a second aspect there is provided a system of detecting a malicious entity in a processing system, wherein the system comprises:

a boot module configured to:
boot prior to the processing system loading an operating system; and
detect if the processing system comprises a malicious entity.

In some form, the system is configured to perform the above method.

In a third aspect there is provided a computer program product for a processing system, the computer program product comprising a computer readable medium having a computer program recorded therein or thereon, the computer program product being configured to enable detection of a malicious entity in a processing system, wherein the computer program product configures the processing system to:

boot the processing system into a boot module prior to loading an operating system; and detect, using the boot module, if the processing system comprises a malicious entity.

In some forms, the computer program product is configured to perform above-mentioned method.

In another broad form, the present invention provides computer readable medium of instructions to perform any of the above methods, and/or for use with any of the above systems.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

The following example provides a more detailed discussion of a particular embodiment of the present invention. The example is intended to be merely illustrative and not limiting to the scope of the present invention.

The following modes, given by way of example only, are described in order to provide a more precise understanding of the subject matter of the present invention.

In the figures, incorporated to illustrate features of an embodiment of the present invention, like reference numerals are used to identify like parts throughout the figures.

Figure 1:
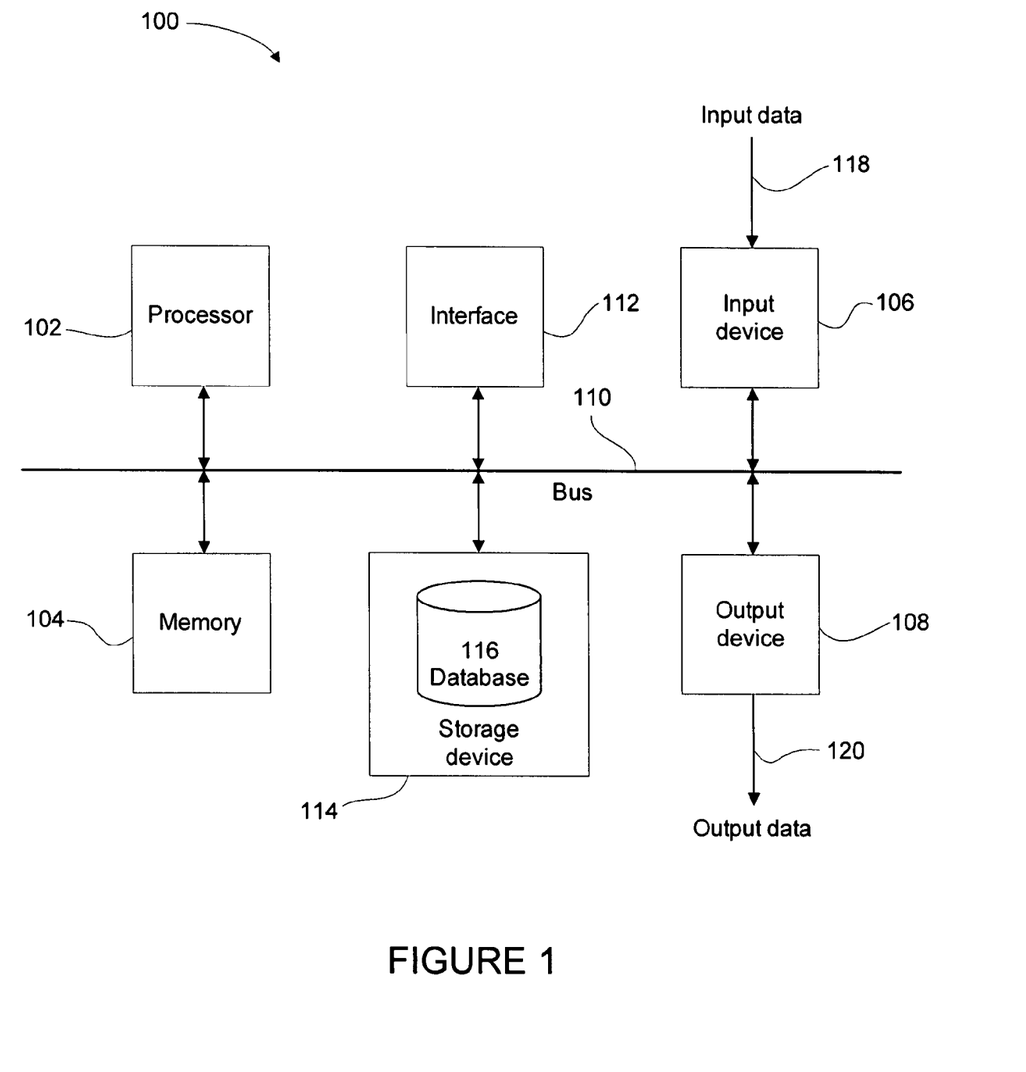
FIG. 1 illustrates a functional block diagram of an example of a processing system that can be utilised to embody or give effect to a particular embodiment.

A particular embodiment of the present invention can be realised using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Figure 2:
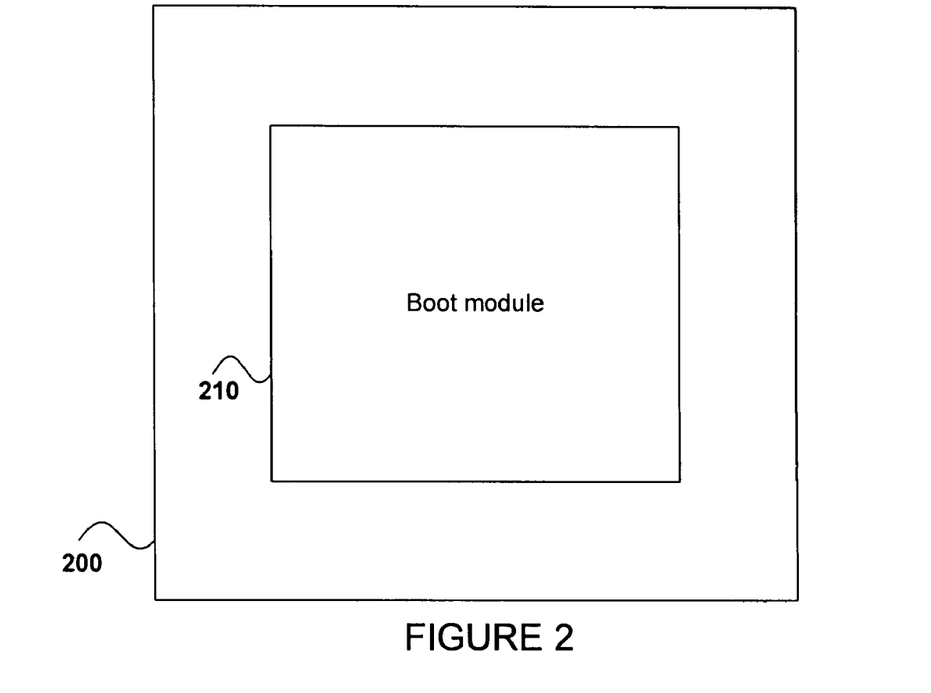
FIG. 2 illustrates a block diagram of an example system to detect malware in a processing system.

Referring now to FIG. 2, there is shown an example of a system 200 to detect malware in a processing system. In particular, the system 200 comprises a boot module which is configured to boot prior to the processing system 100 loading an operating system, and detect if the processing system 100 comprises malware. By booting the boot module and performing a detection of the processing system 100 prior to the operating system loading, malware which could activate during the loading of the operating system can be detected prior to execution, thus restricting malicious activities of the malware.

The boot module 210 can be implemented in software and/or hardware. If the boot module 210 is software, the boot module 210 can be designed to operate on any type of processing system 100.

Figure 3:
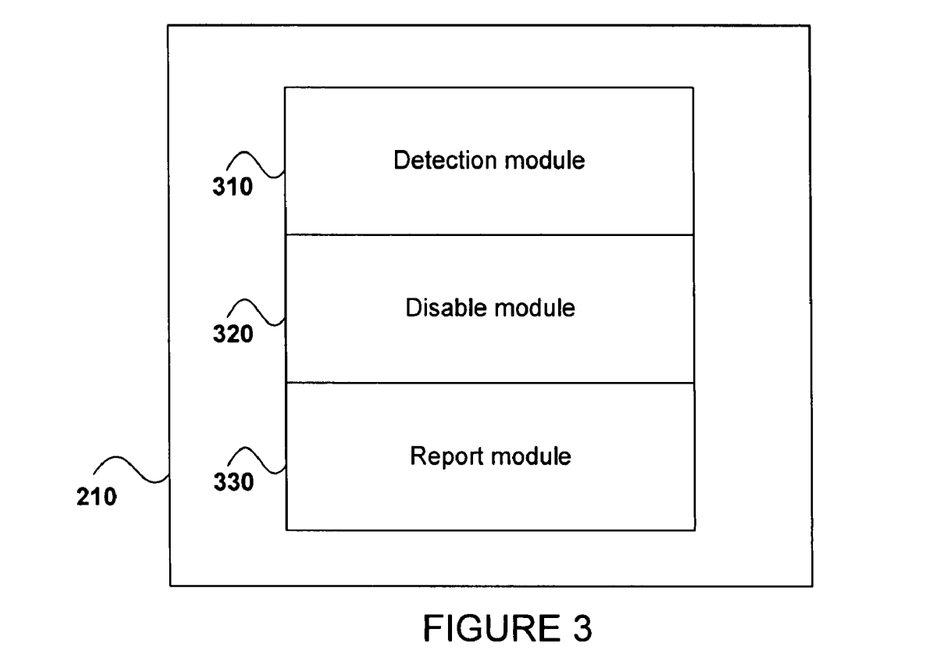
FIG. 3 illustrates a more detailed block diagram of an example of a boot module of the system.

Referring now to FIG. 3, there is shown a more detailed example of the boot module 210. In particular the boot module 210 can comprise a number of sub-modules comprising a detection module 310, a disable module 320, and a report module 330.

Referring first to the detection module 310 of the boot module 210, the detection module 310 can be configured to perform an analysis of the processing system 100. The detection module 310 can analyse data storage components of the processing system 100 to determine whether malware has infected the processing system 100.

Figure 4:
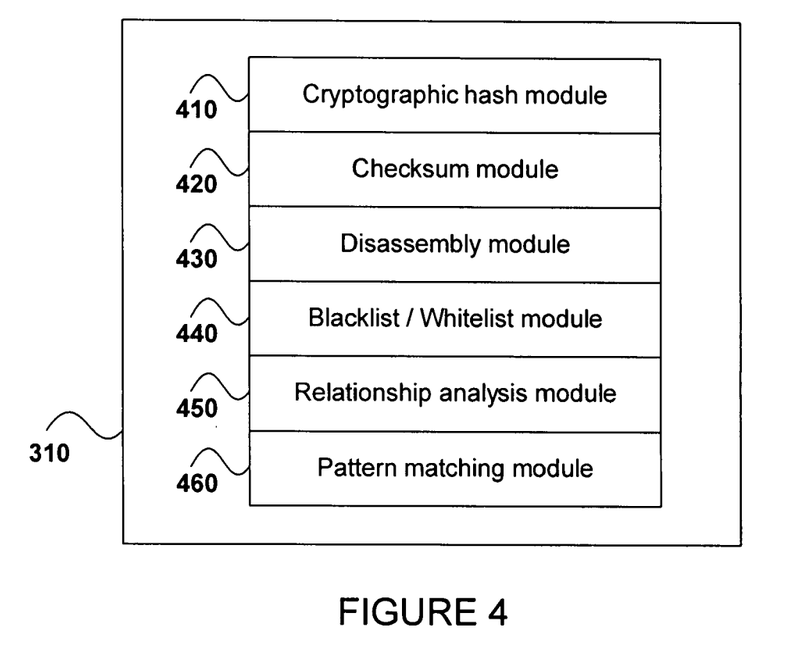
FIG. 4 illustrates a more detailed block diagram of an example of a detection module of the boot module.

As shown in FIG. 4, the detection module 310 can comprise a number of further sub-modules to detect if the processing system 100 is infected with malware. In particular, the detection module 310 can comprise the sub-modules of a cryptographic hash module 410, a checksum module 420, a disassembly module 430, a black-list/white-list module 440, a relationship analysis module 450, and a pattern matching module 460. The detection module 310 can be configured to use one or more of these sub-modules exclusively or in combination to determine if the processing system 100 comprises malware.

Referring now to the sub-modules of the detection module 310, the cryptographic hash module 410 of the detection module 310 is configured to generate a cryptographic hash value of an entity stored on a data storage component of the processing system 100. An entity can be a data object such as a file stored in the processing system 100. As the cryptographic hash value can be used as an identity, the cryptographic hash value can be used in comparisons with a database to determine whether the entity is malicious.

The checksum module 420 of the detection module 310 is configured to determine a checksum of an entity of the processing system 100. The checksum can be compared to a database (blacklist/whitelist module 440) to determine whether the entity is malicious.

The pattern matching module 460 of the detection module 310 is configured to search an entity for particular patterns of strings or instructions which are indicative of malware. The pattern matching module 460 may operate in combination with the disassembly module 430 of the detection module 310. The disassembly module 430 is configured to disassemble the binary code stored for an entity such that the disassembly module 430 determines processing system instructions for the entity. The processing system instructions of the entity can then be used by the pattern matching module 460 to determine whether an entity is malware. Although strings of instructions can be compared by the pattern matching module 460, the pattern matching module 460 may be configured to perform functional comparisons of groups of instructions to determine whether the functionality of the firmware is indicative of malware.

The blacklist/whitelist module 440 of the detection module 310 comprises a list of malicious and/or non-malicious entities. The blacklist/whitelist module may be provided in the form of a table or database which comprises data indicative of malicious and non-malicious entities. The table may comprise checksums and cryptographic hash values for malicious and non-malicious entities. The data stored in the blacklist/whitelist module 440 can be used to determine whether an entity in the processing system 100 is malicious or non-malicious. The blacklist/whitelist module 440 can obtain the list of malicious/and or non-malicious entities and related data using the processing system's data storage component, such as the hard drive of the processing system 100, read-only media, read/write media, and/or a network connection.

The relationship analysis module 450 can be used to detect related malicious entities based on a detected base malicious entity 900. As shown by example in FIG. 9, once a malicious entity 900 has been detected, for example using one or more of the other sub-modules of the detection module 310, a web of related malicious entities 930 can be determined using the relationship analysis module. Generally, malware comprises a bundle of malicious entities. Thus, by only removing a single malicious entity, the malware may not necessarily be disabled from performing some malicious activity. Therefore, detecting a group of malicious entities can be beneficial for disabling the malware.

Figure 9:
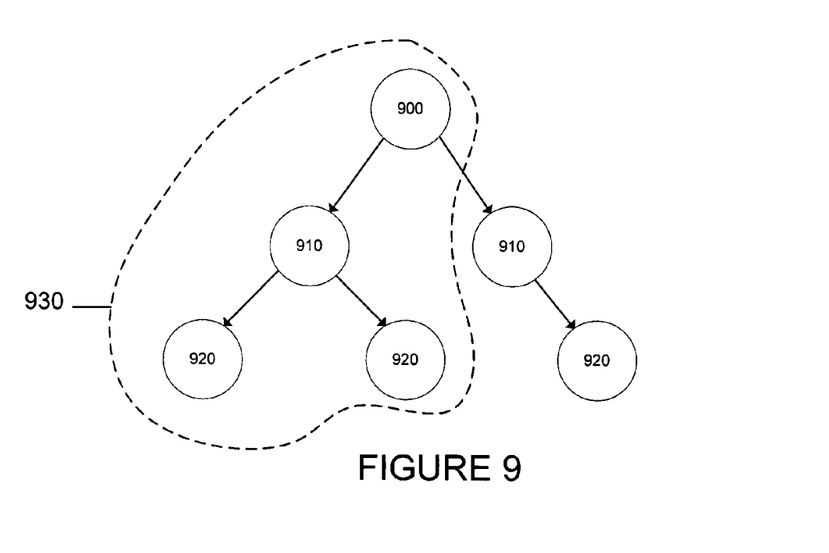
FIG. 9 illustrates a functional block diagram of the operation of a relationship analysis module.

The relationship analysis module 450 can be configured to determine one or more entity properties of the base malicious entity 900. For example, the one or more entity properties could comprise a time which the base malicious entity was created or modified, and/or a directory which the entity is stored in a file system of the processing system 100. The relationship analyser 450 can then perform a search of the data storage components for related entities 910 which also share similar entity properties to the base malicious entity 900.

The one or more related entities 910 can then analysed using one or more of the other sub-modules 410, 420, 430, 440, 460 of the detection module 310 to determine whether the one or more related entities are malicious. The related entities 910 which are determined to be malicious 930 can then be treated as base malicious entities, thereby iteratively determining a group of malicious related entities. In this instance, related entities 920 can be determined based on malicious base entities 910. The iterative process can terminate after an end condition is satisfied when no related entities are determined in a particular repetition; when no new related entities are determined in a particular repetition; when no related entities are determined in a period of time; when the base entity has an entity property which is indicative of the end condition; and when a selected number of repetitions have been performed. Other properties such as entity key words, functional relationships, and a network address which the entity was downloaded from can also be used to determine related entities and potential malicious entities related to the base malicious entity. A more detailed explanation of applying a set of suspicious assessment rules in determining a suspicious/malicious entity is described in the Applicant's co-pending U.S. patent application Ser. No. 11/707,425 entitled "Determination of related entities", the content of which is herein incorporated by cross-reference.

Figure 5:
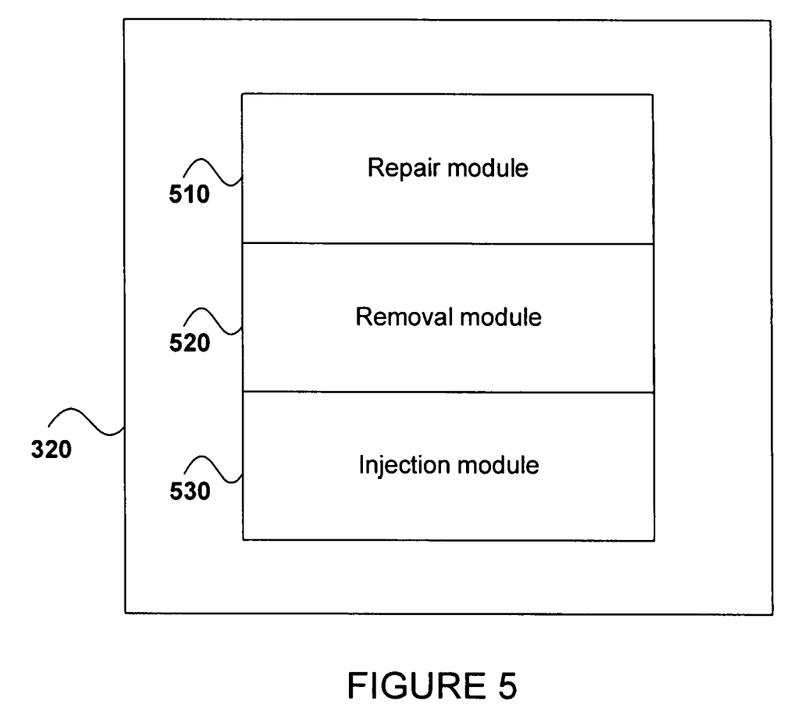
FIG. 5 illustrates a more detailed block diagram of an example of a disable module of the boot module.

Referring back to FIG. 3, the disable module 320 of the boot module 210 is configured to disable detected malware in the processing system. As shown in FIG. 5, the disable module can comprise a number of further sub-modules comprising a repair module 510, a removal module 520, and/or an injection module 530.

The repair module 510 is configured to repair at least a portion of the data stored in the processing system 100 which is related to the detected malware. This can comprise writing or copying uncompromised data over the detected malware. This can optionally comprise overwriting a portion of the malware, or alternatively overwriting the entire malware with uncompromised data. The repair module 510 may retrieve uncompromised data from a data storage medium such as a CD-ROM comprising uncompromised data which can be copied into the data storage components of the processing system 100 which have been infected with malware.

The removal module 520 of the disable module 320 is configured to remove the detected malware from the processing system 100. The removal module 520 can determine whether one of the determined malicious entities of the malware is critical to the operation of the processing system. If the malicious entity of the malware is not critical, the malicious entity is removed by the removal module 520. If the removal module 520 determines that the malicious entity is critical (i.e. the malware may have modified a critical file of the operating system and simply deleting the file will render the processing system 100 unable to load the operating system), then the repair module 510 or the injection module 530 is used to disable the malware. The removal module 520 can use a list of entities which are critical to the operation of the processing system 100 in order to determine the criticalness of a detected entity.

The injection module 530 of the disable module 320 is configured to inject data into the infected data storage component of the processing system 100 such that the malware is disabled from being activated. For example, data may be injected into the detected malware such that the detected malware fails to perform malicious activities. Alternatively, data may be injected into requesting functions which disable the malware being activated. The data which is injected may be processing instructions or programming code which disables the malware to perform malicious activities.

The report module 330 of the boot module 210 is configured to report a detection of malware. In one form, the report module 330 can report the detection to the user of the processing system 100 using an output device 108 of the processing system 100, such as a display. Additionally or alternatively, the report module can report the detection to a server.

Figure 6:
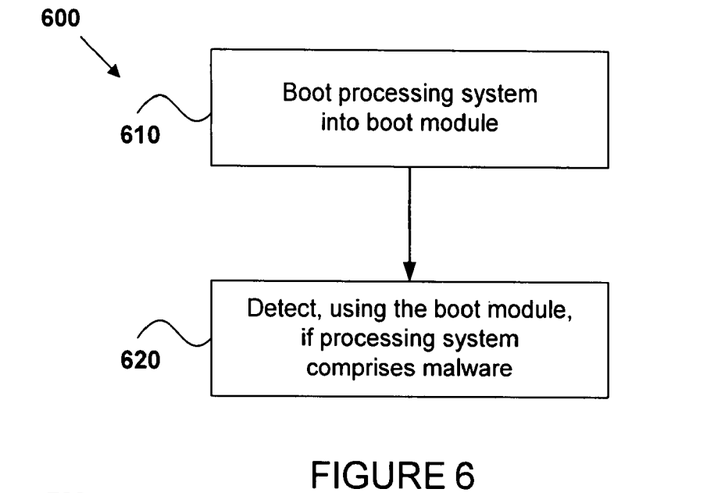
FIG. 6 illustrates a flowchart representing an example of a method of detecting malware in a processing system.

Referring now to FIG. 6, there is shown a flowchart representing an example of a method 600 of detecting malware in a processing system 100.

In particular, at step 610 the method 600 comprises booting the processing system 100 into the boot module 210. In one form, the Master Boot Record of the processing system 100 may be modified such that the processing system 100 boots the boot module 210 prior to the operating system.

The boot module 210 may be provided as a removable storage medium which boots prior to the operating system. In this form, the BIOS of the processing system may require modification such that the removable storage medium boots prior to the operating system of the processing system 100. Alternatively, the boot module 210 may be stored in the hard drive of the processing system 100. The boot module 210 can be stored at a predetermined address such that the processor of the processing system 100 is directed to the boot module 210 when booting.

At step 620, the method 600 comprises detecting, using the boot module 210, if the processing system 100 comprises malware. As the detection can be performed prior to the operating system loading, malware which is activatable during the loading of the operating system can be detected prior to activation.

Figure 7:
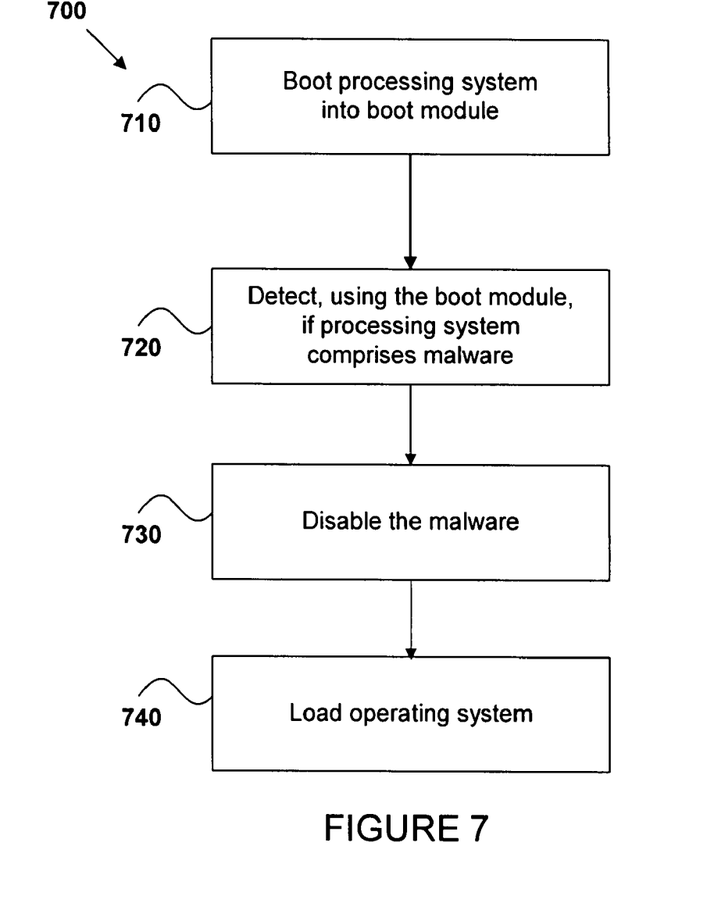
FIG. 7 illustrates a flowchart representing an example of a method of detecting and disabling malware in a processing system.

Referring now to FIG. 7, there is shown a flowchart representing an example of a method 700 of detecting and disabling malware in a processing system 100.

In particular, steps 710 and 720 are performed similarly to steps 610 and 620 respectively.

At step 730, the method comprises disabling the detected malware. This can be performed using the disabling module such as to restrict the malware performing malicious activities using the processing system 100.

At step 740, the method comprises loading the operating system of the processing system. The processing system may requiring rebooting if data stored in the processing system has been modified. The processor of the processing system 100 can be directed to a predetermined address in the hard drive to begin loading the operating system.

Figure 8A:
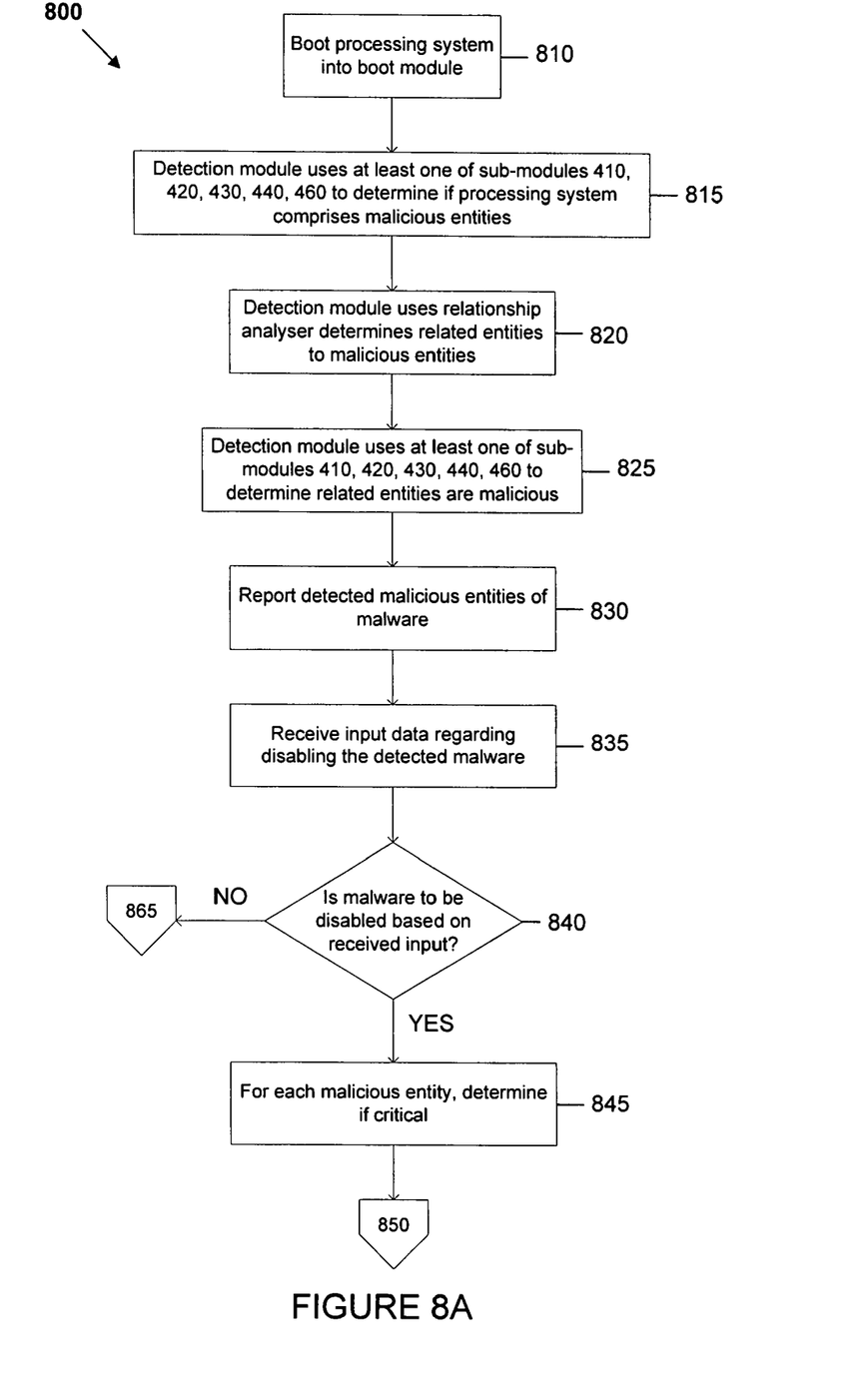
FIGS. 8A and 8B illustrate a more detailed flowchart representing an example of a method of detecting and disabling malware in a processing system.
Figure 8B:
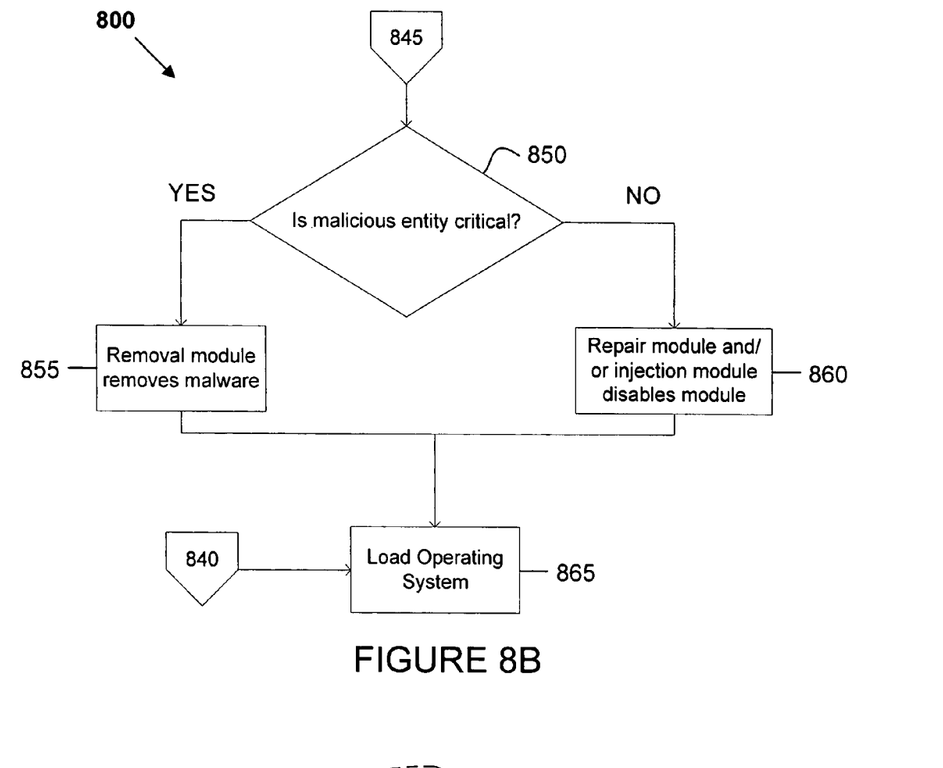

A more detailed method of detecting and disabling malware in a processing system will now be described with reference to FIG. 8.

In particular, at step 810 the method 800 comprises booting the boot module. At step 815, the method comprises the detection module 310 using one of the cryptographic hash module 410, the checksum module 420, the disassembly module 430, the black-list/white-list module 440, and the pattern matching module 460 to determine if the processing system 100 comprise malicious entities.

In the event of determining at least one malicious entity, the method can comprise at step 820 the detection module using the relationship analysis module 450 to iteratively determine any related entities to the malicious entity.

At step 825, if the relationship analysis module 450 determines related entities, at least one of the cryptographic hash module 410, the checksum module 420, the disassembly module 430, the black-list/white-list module 440, and the pattern matching module 460 can be used to determine whether any of the related entities are malicious, thereby obtaining the malware in the processing system.

At step 830, the method 800 comprises reporting the malicious entities of the malware. This can comprise reporting the detected malicious entities to the user using an output device 108 of the processing system 100, such as the display. Additionally or alternatively, the method comprises reporting the detection to a server.

At step 835, the method 800 comprises receiving input data regarding the disablement of the malware. In particular, the boot module 210 may receive input data from an input device 106 operated by the user indicating that the malware is to be removed. At step 840, the method comprises determining, based on the input data, if the malware is to be disabled. If the malware is to be disabled, the method continues to step 845. In the event that the malware is not to be disabled, the method continues to step 865 where the operating system is loaded.

At step 845 and 850, the method 800 comprises the disable module determining whether one or more of the malicious entities of the malware is critical to the operation of the processing system. Critical entities may comprise operating system files which when deleted cause the operating system to fail to boot or operate correctly. In the event the one or more malicious entities are determined critical, the method continues to step 855. In the event that the one or more malicious entities are determined to not be critical, the method continues to step 860. It will be appreciated that some of the malicious entities of the malware can be handled using step 855, whilst the other portion of the malicious entities can be handled using step 860.

At step 855, the method comprises removing the malicious entities of the malware which are not critical. Step 855 can be performed using the removal module 510. At step 860, the method comprises the repair module 520 or the injection module 520 disabling the malicious entities of the malware which are critical. In this instance, the repair module 520 may copy over particular malicious entities which a copy of an uncompromised entity is available, otherwise, the injection module 530 injects data to disable the malicious entities of the malware.

At step 865, the method comprises loading the operating system of the processing system.

It will be appreciated that if a removable boot media comprising the boot module is not used, such as a CD-ROM, then the method may optionally comprise a step of copying the bootloader of the processing system, modifying the bootloader (MBR) of the operating system such as to boot the boot module, then booting the boot module as previously indicating, and prior to loading the operating system, copying the copied version of the bootloader over the modified bootloader.

An example of pseudocode that may be used for providing a boot module 210 is shown below:

```
010   loadinit PROCEDURE // called from the user installed OS
020        CALL functions to backup system bootloader / configuration
030        CALL function to modify system bootloader / configuration
040        CALL procedure to reboot the user's system
050   END
060   osinit PROCEDURE // called from bootloader
070        CALL procedure to initialize system structures
080        CALL procedures to set up system services
090        CALL procedures to set up runtime environment
100        EXECUTE spyware scanning software
110        WAIT UNTIL spyware scanning software has terminated
120        CALL functions to restore system bootloader.
130        CALL procedure to reboot the user's system
140   END
```

Line 090 of the pseudocode may also indirectly call a set of functions/procedures which can set up an emulation of the user's installed operating system, which allows the boot module 210 to be a binary file which is similar or identical to that of the user's installed operating system.

As previously indicated, if the method is performed using removable bootable media then the osinit procedure does not require line 120.

In an optional form, the boot module 210 may comprise user interface services, file system services, and network connection services. Optionally, the boot module 210 can update the blacklist/whitelist from a server using the network connection services made available under this option, such as to facilitate detecting the malware and in some forms disabling the malware.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A method of detecting a malicious entity in a processing system, wherein the method comprises:
   booting the processing system into a boot module prior to loading an operating system;
   detecting, using the boot module, if the processing system comprises a malicious entity, wherein the malicious entity modifies an object relating to the operating system;
   determining, using the boot module, whether the modified object is used to load the operating system; and
   in response to not using the modified object to load the operating system, disabling, using a disable module, the malicious entity and the modified object.

2. The method according to claim 1, wherein the boot module comprises a detection module, wherein the method comprises analysing, using the detection module, one or more data storage components of the processing system to determine whether the malicious entity has infected the processing system.

3. The method according to claim 2, wherein the detection module comprises a plurality of submodules comprising at least one of a cryptographic hash module, a checksum module, a disassembly module, a black-list/white-list module, a relationship analysis module, and a pattern matching module, wherein the method comprises analysing, using the plurality of submodules, the data storage components of the processing system to determine whether the malicious entity has infected the processing system.

4. The method according to claim 3, wherein the method comprises:
   generating, using the cryptographic hash module, a cryptographic hash value of an entity stored on the data storage component of the processing system; and
   comparing the cryptographic hash value to a database to determine whether the entity is malicious, wherein the database comprises a plurality of cryptographic hash values identifying malicious entities.

5. The method according to claim 3, wherein the method comprises:
   generating, using the checksum module, a checksum value of an entity stored on the data storage component of the processing system; and
   comparing, using the black-list/white-list module, the checksum value to a list to determine whether the entity is malicious, wherein the list comprises records indicative of malicious entities and non-malicious entities.

6. The method according to claim 3, wherein the method comprises:
   disassembling, using the disassembly module, an entity stored on the data storage component of the processing system; and
   performing a comparison, using the pattern matching module, between the disassembled entity and a list of patterns associated with malicious activity.

7. The method according to claim 3, wherein in the event that an entity stored on the data storage component of the processing system is determined to be malicious, the method comprises:
   (a) setting the malicious entity as a base entity;
   (b) determining an entity property of the base entity;
   (c) determining, using the relationship analysis module, one or more related entities to the base entity which are related by the entity property; and
   (d) performing, using the detection module, an analysis of the related entities to determine if one or more of the related entities are malicious.

8. The method according to claim 7, wherein the method comprises:
   setting the one or more related entities as the base entity; and
   repeating steps (b) and (c), followed by step (d) until an end condition is satisfied.

9. The method according to claim 8, wherein the end condition is at least one of:
   when no related entities are determined in a particular repetition;
   when no new related entities are determined in a particular repetition;
   when no related entities are determined in a period of time;
   when the base entity has an entity property which is indicative of the end condition; and
   when a selected number of repetitions have been performed.

10. The method according to claim 1, wherein the disable module comprises at least one of a repair module, a removal module and an injection module.

11. The method according to claim 10, wherein in the event that a malicious entity is detected, the method comprises repairing, using the repair module, at least a portion of data stored on the data storage component of the processing system comprising at least one of:
    writing uncompromised data over at least a portion of the detected malicious entity; and
    copying, from an uncompromised data source, uncompromised data over at least a portion of the detected malicious entity.

12. The method according to claim 10, wherein in the event that a malicious entity is detected, the method comprises injecting, using the injection module, data into the data storage component to disable the malicious entity performing malicious activity.

13. A system of detecting a malicious entity in a processing system, wherein the system comprises:
    a processor;
    memory in electronic communication with the processor;
    a boot module configured to:
       boot prior to the processing system loading an operating system;
       detect if the processing system comprises a malicious entity, wherein the malicious entity modifies an object relating to the operating system;
       determine whether the modified object is used to load the operating system; and
    a disable module configured to:
    in response to the modified object not being used to load the operating system, disable the malicious entity and the modified object.

14. The system according to claim 13, wherein the boot module comprises a detection module, wherein the boot detection module is configured to analyse one or more data storage components of the processing system to determine whether the malicious entity has infected the processing system.

15. The method according to claim 14, wherein the detection module comprises a plurality of submodules comprising at least one of a cryptographic hash module, a checksum module, a disassembly module, a black-list/white-list module, a relationship analysis module, and a pattern matching module.

16. The system according to claim 13, wherein the disable module comprises at least one of a repair module, a removal module and an injection module.

17. A computer program product embedded in a non-transitory computer storage readable medium having a computer program recorded therein or thereon, when executed by a processor, results in a machine performing the functions of:

boot the processing system into a boot module prior to loading an operating system;

detect, using the boot module, if the processing system comprises a malicious entity, wherein the malicious entity modifies an object relating to the operating system;

determine, using the boot module, whether the modified object is used to load the operating system; and in response to the modified object not being used to load the operating system, disable, using a disable module, the malicious entity and the modified object.

* * * * *